(12) United States Patent
Landschütze et al.

(10) Patent No.: US 9,562,112 B2
(45) Date of Patent: Feb. 7, 2017

(54) CARBOXY-FUNCTIONALIZED ALTERNAN

(71) Applicant: CRODA INTERNATIONAL PLC, Yorkshire (GB)

(72) Inventors: Volker Landschütze, Berlin (DE); Sylvia Radosta, Nuthetal (DE); Waltraud Vorwerg, Potsdam (DE)

(73) Assignee: CRODA INTERNATIONAL PLC, East Yorkshire (GB)

( * ) Notice: Subject to any disclaimer, the term of this patent is extended or adjusted under 35 U.S.C. 154(b) by 0 days.

(21) Appl. No.: 14/423,180

(22) PCT Filed: Aug. 23, 2013

(86) PCT No.: PCT/EP2013/067554
§ 371 (c)(1),
(2) Date: Feb. 23, 2015

(87) PCT Pub. No.: WO2014/029875
PCT Pub. Date: Feb. 27, 2014

(65) Prior Publication Data
US 2015/0239995 A1    Aug. 27, 2015

Related U.S. Application Data

(60) Provisional application No. 61/692,762, filed on Aug. 24, 2012.

(30) Foreign Application Priority Data

Aug. 24, 2012  (EP) ...................................... 12181749

(51) Int. Cl.
*C08B 37/00* (2006.01)
*C08L 5/00* (2006.01)

(52) U.S. Cl.
CPC .............. *C08B 37/0009* (2013.01); *C08L 5/00* (2013.01)

(58) Field of Classification Search
CPC ................................ C08B 37/0009; C08L 5/00
See application file for complete search history.

(56) References Cited

U.S. PATENT DOCUMENTS

| | | | |
|---|---|---|---|
| 5,702,942 | A | 12/1997 | Leathers |
| 2003/0229923 | A1 | 12/2003 | Kossmann |
| 2006/0127328 | A1 | 6/2006 | Monsan |

FOREIGN PATENT DOCUMENTS

| | | |
|---|---|---|
| WO | 0047628 | 8/2000 |
| WO | 0047727 | 8/2000 |
| WO | 2006088884 | 8/2006 |
| WO | 2008098975 | 8/2008 |
| WO | 2010043423 | 4/2010 |

OTHER PUBLICATIONS

Ito et al., Biomaterials, 2007, 28, p. 3418-3426.*
Cote, G.L., "Alternan", Biopolymers Online, published online Jan. 15, 2005, p. 1-34, accessed online at http://onlinelibrary.wiley.com/doi/10.1002/3527600035.bpol5013/full on Apr. 12, 2016.*
Soliman et al., Int. J. Pharm., 2008. 356, p. 248-258.*
Cote, G.L., "Low-viscosity Alpha-D-glucan fractions derived from sucrose which are resistant to enzymatic digestion," 1992, pp. 249-252, vol. 19, Carbohydrate Polymers.
Cote, G.L. et al., "Isolation and partial characterization of an extracellular glucansucrase from Leuconostoc mesenteroides NRRL B-1355 that synthesizes an alternating (1→6), (1→3)-Alpha-D-glucan," 1982, pp. 57-74, vol. 101, Carbohydrate Research.
Jeanes, A. et al., "Characterization and classification of dextrans from ninety-six strains of bacteria," Oct. 20, 1954, pp. 5041-5052, vol. 76, Journal of the American Chemical Society.
Joucla, G. et al., "Construction of a fully active truncated alternansucrase partially deleted of its carboxy-terminal domain," 2006, pp. 763-768, vol. 580, FEBS Letters.
Misaki, A. et al., "Structure of the dextran of Leuconostoc mesenteroides B-1355," 1980, pp. 273-285, vol. 84, Carbohydrate Research.
Raemaekers, M.H.M. et al., "Production of Alternansucrase by Leuconostoc mesenteroides NRRL B-1355 in batch fermentation with controlled pH and dissolved oxygen," 1997, pp. 470-478, vol. 69, Journal of Chemical Technology and Biotechnology.
European Search Report for European Application No. 12181749.8-2115 dated Nov. 6, 2012.
International Search Report for International Application No. PCT/EP2013/067554 mailed Mar. 7, 2014.
Seidel et al., "Synthesis and Characterization of Cross-Linked Carboxymethyl Potato Starch Ether Gels;" Starch, 2004, pp. 157-166.
Office Action for Corresponding Colombia Patent Application No. 15-039211, Dated May 12, 2016.
Associate English Statement of Relevance of Colombian Office Action of May 12, 2016.

* cited by examiner

*Primary Examiner* — Jonathan S Lau
(74) *Attorney, Agent, or Firm* — RatnerPrestia

(57) ABSTRACT

Functionalized alternan, comprising carboxy groups as functional groups, wherein the alternan can be described by the following formula (I) Alternan (I) wherein $R_1$ is a hydrocarbon group with 1 to about 100 carbon atoms, optionally featuring one or more heteroatoms, wherein the oxygen between "Alternan" and $R_1$ in Formula (I) is an oxygen of an ether group, as well as the procedures for producing such a functionalized alternan in a aqueous medium or using an alcohol or an alcohol-water mixture as a reaction medium, and the use of this functionalized alternan.

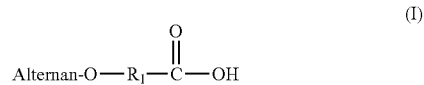

14 Claims, 3 Drawing Sheets

CARBOXY-FUNCTIONALIZED ALTERNAN

CROSS REFERENCE TO RELATED APPLICATIONS

This application is the U.S. National Phase application of PCT International Application No. PCT/EP2013/067554, filed Aug. 23, 2013, and claims priority of U.S. Provisional Patent Application No. 61/692,762, filed Aug. 24, 2012 and EP Application No. 12181749.8, filed Aug. 24, 2012, the disclosures of which are incorporated herein by reference in their entireties for all purposes.

FIELD OF THE INVENTION

The present invention relates to an alternan that is functionalized using carboxy groups; a process for producing it; and its applications.

BACKGROUND OF THE INVENTION

Alternan (CAS registration no.: 136510-13-9) is a saccharide made up of anhydroglucose units that are primarily linked by alternating α-1.3 and α-1.6-glycosidic bonds. Thus alternan belongs to the group of the a glucans. Alternan and the processes for producing alternan are known from prior art and are described, for instance, in Jeanes et al. (1954) J. Am. Chem. Soc., 76: 5041-5052, Misaki et al. (1980) Carbohydr. Res., 84: 273-285, Cote and Robyt (1982), Carbohydr. Res., 101: 57-74, Cote (1992), Carbohydrate Polymers 19, 249-252, WO 00/47727, U.S. Pat. No. 5,702,942, US20060127328, PCT/EP2008/051760.

The state of the art describes derivatized alternan. Alternan carboxylic acid esters and their use as emulsifiers are known from WO2010043423A1.

SUMMARY OF THE INVENTION

The task of the present invention is to provide an alternan with novel properties. Novel properties are to be achieved that will render the alternan suitable for specific applications.

This task is solved by the carboxy-functionalized alternan described herein. One aspect of the present invention relates to a functionalized alternan polysaccharide, comprising carboxy groups as functional groups, wherein the alternan polysaccharide comprises structures of Formula (I):

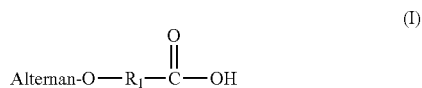

(I)

wherein
$R_1$ is a hydrocarbon group with 1 to about 100 carbon atoms, wherein said group can comprise one or more heteroatoms, and wherein the alternan can contain one or more of the —$R_1$—COOH groups, and wherein one or more of the groups —$R_1$—COOH can be deprotonated to —$R_1$—COO$^-$, and wherein the oxygen between "Alternan" and $R_1$ in Formula (I) is an oxygen of an ether group.

DETAILED DESCRIPTION OF THE INVENTION

Figure 1:
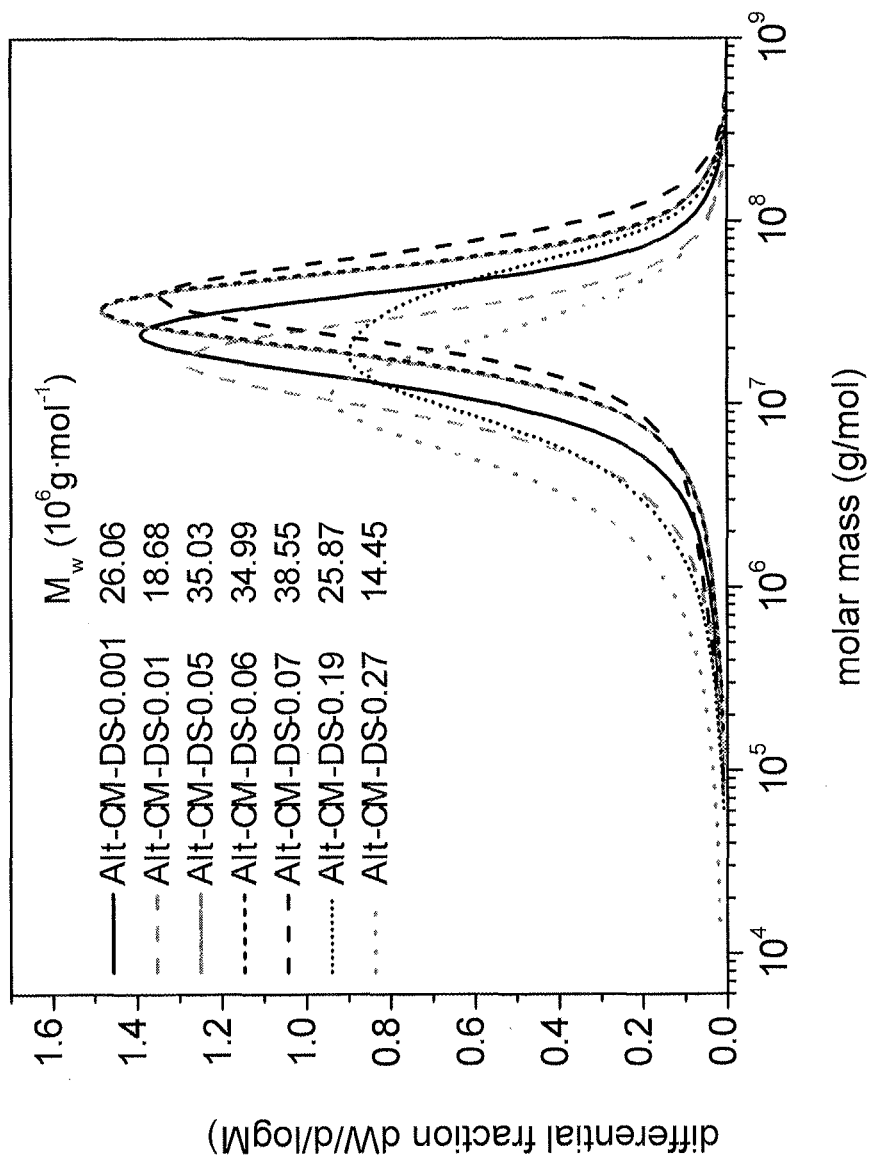
FIG. 1 shows the molar mass distributions for carboxymethyl alternan with various DS values.

A functionalized alternan of the invention comprises carboxy groups as functional groups and it is described by following formula:

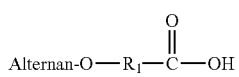

(I)

wherein $R_1$ is a hydrocarbon group with 1 to about 100 carbon atoms, that may include one or more heteroatoms. The alternan as per Formula (I) can include one or more of the —R1-COOH groups. Formula (I) should be understood to show only one such group as an example. Consequently, an alternan is shown that is functionalized with one or more of the —R1-COOH groups. One or more of the groups —R1-COOH can be deprotonated to —R1-COO$^-$.

In Formula (I) the oxygen between "Alternan" and $R_1$ is an oxygen of an ether group. In other words, R1 is bound to "alternan" via an ether bridge, and the structure alternan-O—R1 is an ether structure. Formula (I) describes an alternan ether, functionalized with carboxy groups. The oxygen between the "alternan" and the —$R_1$—COOH group originates from a hydroxy group of an alternan that is not yet functionalized or chemically modified at this hydroxy group. The —$R_1$—COOH group is thus bound to the alternan backbone via this type of oxygen, in other words with the backbone of the alternan polysaccharide. In the functionalized alternan, said hydroxy-oxygen is transferred into an oxygen of an ether group. The alternan backbone is composed of anhydroglucose units that are primarily linked by alternating α-1.3 and α-1.6-glycosidic bonds. The anhydroglucose units comprise hydroxy units.

The process of the invention for carboxylization of the alternan may provide one or more of the following advantages:
 low level of molar mass degradation
 broad degree of substitution (DS) ranges and high degrees of substitution obtainable
 even at low substitution levels a water-soluble product is obtained. By comparison, much higher substitution levels are needed to obtain water-soluble carboxyl methyl cellulose.

Surprisingly, it was found that the carboxy-functionalized alternan, or specific embodiments thereof, may provide the following properties:
 very good water-solubility
 increased transparency compared to unmodified alternan
 ability to produce concentrated aqueous solutions with viscosity that is several orders of magnitude higher than with unmodified alternan
 ability to produce highly transparent hydrogels
 ability to produce simplex structures, which refer to complexes with cationic polymers high stability of the functionalization, even at low pH possibility degrade the molecular weight and thereby retaining the functional groups at oligomeric or monomeric units.

The term "alternan" describes a substance that has already been defined above. In this invention, the term "alternan" refers to alternan polysaccharides. The shorter term "alternan" will thus be used in place of "alternan polysaccharide" below, to refer to the polysaccharide for the purpose of the following description of the invention. The term "polysaccharide" refers to a polysaccharide with an average molar mass (weight average molecular weight) Mw of at least 3000 g/mol, preferably at least 5000 g/mol.

Alternan is preferably produced by a bacterial enzyme, particularly by an alternansucrase, wherein this term encompasses for purpose of the present invention alternansucrase from natural source or a modified alternansucrase. The term "modified alternansucrase" encompasses, for example, chemically and genetically modified alternansucrase. Possible modifications of alternansucrase are mutations, insertions, deletions, and/or truncations of amino acids. Natural and modified alternansucrase enzymes are—inter alia described in international patent applications WO 200047727 and WO2008098975.

In this invention, the term "carboxy-functionalized alternan" refers to an alternan to which functional carboxy groups have been bound by way of a chemical process. Instead of the term "carboxy-functionalized alternan," the shorter term "functionalized alternan" will also be used with the same meaning. Another expression for "functionalized alternan" is the term "derivatized alternan."

The term "carboxy group," also known as a "carboxyl group," refers to a functional group with the formula —COOH. The term "carboxy group" also includes the associated anion —COO⁻ (carboxylate) in the sense of this invention. Depending on the environmental conditions, such as the pH value of the environment, the functional group can exist as —COOH or —COO⁻.

In Formula (I) and in the other following formulas, the term "alternan" refers to an alternan polysaccharide molecule. The oxygen bound to "alternan" is oxygen from a hydroxy group of an alternan, for example an alternan-precursor, that is not yet functionalized or chemically modified at this hydroxy group. In other words said oxygen originates from a hydroxy group of an alternan that is not yet functionalized or chemically modified at this hydroxy group. Anhydroglucose units in the alternan can be functionalized at the free OH groups in the C-2, C-3, C-4 and/or C-6 position. Due to the alternating bond types of the alternan all of the OH groups in the C-2 and C-4 position of the monomere building block, and about 50% of the OH groups in the C-3 and C-6 position, are available for functionalization. The invention's carboxy-functionalized alternans thus contain primarily functionalizations at the C-2, C-3, C-4 and/or C-6 position of the anhydroglucose unit of the polymer.

$R_1$ describes a hydrocarbon group that can include one or more heteroatoms in addition to carbon and hydrogen. Preferred heteroatoms, without limitation, are O, N, S, P, F, Cl, Br and I. A heteroatom can be integrated into a carbon chain in such a way that the carbon chain or the carbon backbone is interrupted by the heteroatom. For instance, the $R_1$ group can contain ether units like —CH$_2$—O—CH$_2$; thioether units like —CH$_2$—S—CH$_2$; or —CH$_2$—NH—CH$_2$ units. In another version, the heteroatom(s) is (are) attached to the carbon backbone in the form of a substituent, for instance as an oxo, hydroxy, mercapto, halogen, amino or nitro group. The invention also includes embodiments where the $R_1$ group comprises one or more carboxy groups in addition to the carboxy group described in Formula (I).

In a special embodiment, the hydrocarbon $R_1$ group is selected from an alkylene group, an alkenylene group, an alkynylene group, a cycloalkylene group, a hetero-cycloalkylene group, an arylene group or a hetero-arylene group. Mixtures of these are also included in any combination, for instance
 a hydrocarbon group consisting of one or more alkylene groups and one or more arylene groups
 a hydrocarbon group consisting of one or more alkylene groups and one or more cycloalkylene groups.

In the present invention, the term "alkyl group" refers to a monovalent, linear or branched, saturated hydrocarbon group. An alkyl group can be substituted with one or more functional groups selected from oxo, hydroxy, alkoxy, carboxy, aldehyde, amino, monoalkylamino, dialkylamino, nitro, fluoro, chloro, bromo and/or iodo. Preferred alkyl groups particularly include methyl (—CH$_3$), ethyl (—CH$_2$CH$_3$), propyl (—CH$_2$CH$_2$CH$_3$), isopropyl (—CH(CH$_3$)$_2$), butyl (—CH$_2$CH$_2$CH$_2$CH$_3$), isobutyl (—CH$_2$CH(CH$_3$)CH$_3$) and tert-butyl.

In the present invention, the term "alkylene group" refers to a divalent, linear or branched, saturated hydrocarbon group. An alkylene group can be substituted by one or more functional groups selected from oxo, hydroxy, alkoxy, carboxy, aldehyde, amino, monoalkylamino, dialkylamino, nitro, fluoro, chloro, bromo and/or iodo. Preferred alkylene groups, for $R_1$ as well, are methylene (—CH$_2$—), ethylene (—CH$_2$CH$_2$—), propylene (—CH$_2$CH$_2$CH$_2$—), isopropylene (—CH$_2$CH(CH$_3$)—), butylene (—CH$_2$CH$_2$CH$_2$CH$_2$—) and isobutylene (—CH$_2$CH(CH$_3$)CH$_2$—), wherein methylene is most preferred.

In the present invention, the term "alkenylene group" refers to a divalent, linear or branched hydrocarbon group that features one or more C—C double bonds. An alkenylene group can feature one or more substituents as described above for the alkylene group.

In the present invention, the term "alkynylene group" refers to a divalent, linear or branched hydrocarbon group that features one or more C—C triple bonds. An alkynylene group can feature one or more substituents as described above for the alkylene group.

In the present invention, the term "cycloalkylene group" refers to a divalent saturated or partially unsaturated, non-aromatic carbocyclic group that is preferably made up of mono, bi or tricyclic carbon rings, wherein the cycles can be condensed or linked otherwise. A cycloalkylene group can comprise one or more substituents as described above for the alkylene group.

In the present invention, the term "hetero-cycloalkylene group" refers to a divalent saturated or partially unsaturated, non-aromatic carbocyclic group that is preferably made up of mono, bi or tricyclic carbon rings, wherein the cycles can be condensed or linked otherwise, and wherein one or more carbon atoms in the ring system are replaced by a heteroatom, particularly nitrogen, oxygen or sulfur. A hetero-cycloalkylene group can comprise one or more substituents as described above for the alkylene group.

In the present invention, the term "arylene group" refers to a divalent cyclic aromatic group that is preferably mono, bi or tricyclic, wherein the cycles can be condensed or linked otherwise through C—C bonds. Some examples are phenylene, naphthylene, biphenylene, anthracylene and phenantrylene. An arylene group can have one or more substituents as described above for the alkylene group.

In the present invention, the term "hetero-arylene group" refers to a divalent cyclic aromatic group that is preferably mono, bi or tricyclic, wherein the cycles can be condensed or linked otherwise through C—C bonds, and wherein one or more carbon atoms in the ring system are replaced by a heteroatom, particularly nitrogen, oxygen or sulfur. A hetero-arylene group can have one or more substituents as described above for the alkylene group.

In one embodiment, the invention relates to a functionalized alternan described by the following Formula (II):

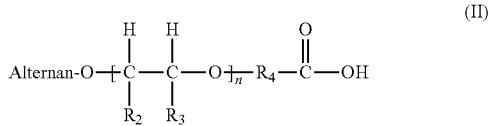
(II)

wherein n is an integer between 1 and about 30, preferably from 1 to about 20, and even more preferably from 1 to about 10, $R_2$ and $R_3$ are selected from H or a hydrocarbon group with 1 to about 6 carbon atoms, wherein $R_2$ and $R_3$ can be the same or different in the —($CHR_2$—$CHR_3$O)— units and each $R_2$ and $R_3$ in a —($CHR_2$—$CHR_3$O)— unit can be selected independently from each $R_2$ and $R_3$ in another —($CHR_2$—$CHR_3$—O)— unit, $R_4$ is a hydrocarbon group with 1 to about 10 carbon atoms, wherein the alternan can comprise one or more —[$CHR_2$—$CHR_3$—O]$_n$$R_4$COOH groups, and wherein the oxygen between "Alternan" and —[$CHR_2$—$CHR_3$—O]$_n$$R_4$COOH is an oxygen of an ether group. In other words, —[$CHR_2$—$CHR_3$—O]$_n$$R_4$COOH groups is bound to "Alternan" via an ether bridge.

In this embodiment, the $R_1$ group defined in Formula (I) above corresponds to a —[$CHR_2$—$CHR_3$—O]$_n$$R_4$— group.

The oxygen between the "alternan" and the —[$CHR_2$—$CHR_3$—O]$_n$$R_4$COOH group is an oxygen originating from a hydroxy group of an alternan, for example an alternan-precursor, that is not yet functionalized or chemically modified at this hydroxy group. The —[$CHR_2$—$CHR_3$—O]$_n$$R_4$COOH group is thus bound to the alternan backbone via this oxygen, in other words to the backbone of the alternan polysaccharide.

$R_2$ can specifically be selected from hydrogen, an alkyl group or a phenyl group. Preferably, $R_2$ is $C_1$ to $C_4$ alkyl or hydrogen, even more preferably a methyl group, an ethyl group or hydrogen, and most preferably a methyl group or hydrogen. These $R_2$ can be combined with any value n.

$R_3$ can specifically be selected from hydrogen, an alkyl group or a phenyl group. Preferably, $R_3$ is $C_1$ to $C_4$ alkyl or hydrogen, even more preferably a methyl group, an ethyl group or hydrogen, and most preferably a methyl group or hydrogen. These $R_3$ can be combined with any value n.

In an embodiment that can be combined with any value n, $R_2$ is hydrogen and $R_3$ is hydrogen, methyl or ethyl, most preferably hydrogen or methyl.

In an embodiment that can be combined with any value n, $R_3$ is hydrogen and $R_2$ is methyl or ethyl, most preferably methyl.

In an embodiment that can be combined with any of the above variants of $R_2$ and $R_3$, $R_4$ is an alkylene group, preferably methylene (—$CH_2$—), ethylene (—$CH_2CH_2$—), propylene (—$CH_2CH_2CH_2$—), isopropylene (—$CH_2CH$($CH_3$)—), butylene (—$CH_2CH_2CH_2CH_2$—) or isobutylene (—$CH_2CH(CH_3)CH_2$—), wherein methylene is most preferred.

In another embodiment, a functionalized alternan is provided that additionally, in other words in addition to the carboxy functionalizations given in Formulas (I) and (II), comprises one or more groups of Formula (III)

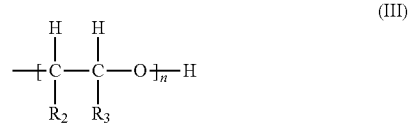
(III)

wherein the group of Formula (III) is bound to the alternan polysaccharide via an ether bridge, n is an integer from 1 to about 30, preferably from 1 to about 20, even more preferably from 1 to about 10, $R_2$ and $R_3$ are selected from H or a hydrocarbon group with 1 to about 6 carbon atoms, wherein $R_2$ and $R_3$ can be the same or different in the —($CHR_2$—$CHR_3$O)— units and each $R_2$ and $R_3$ in a —($CHR_2$—$CHR_3$O)— unit can be selected independently from each $R_2$ and $R_3$ in another —($CHR_2$—$CHR_3$—O)— unit.

The connection via an ether bridge means that the group of Formula (III) is bound to an oxygen of an alternan. The oxygen originates from a hydroxy group from an alternan that that is not yet functionalized at this hydroxy group, for example an alternan precursor. The group of Formula (III) is thus bound to the alternan backbone, in other words the backbone of the alternan polysaccharide, via this oxygen. The connection of the group of Formula (III) to "Alternan" is thus analogous to the structure of Formula (II).

The groups $R_2$ and $R_3$ in Formula (III) also specifically have the same meaning, including in terms of special embodiments, as described above in Formula (II).

One embodiment provides with a functionalized alternan whose molecules primarily or exclusively have a degree of polymerization (DP) of at least 10, preferably at least 100, or at least 1000, or at least 10000, or at least 100000, even more preferably at least 150000. The term "primarily" in a preferred definition means that the proportion of alternan molecules with the specified minimum DP has a concentration of more than 95% by weight, with reference to the total weight of all alternan molecules, or more preferably more than 97% by weight, or even more preferably more than 99% by weight.

In a special embodiment that can be combined with the previous and further embodiments, the functionalized alternan has an average molar mass Mw in the range from 3,000 g/mol to 60,000,000 g/mol, or more preferably from 5,000 g/mol to 60,000,000 g/mol, 10,000 g/mol to 60,000,000 g/mol, or 20,000 g/mol to 60,000.000 g/mol, or most preferably from 50,000 g/mol to 60,000,000 g/mol, 100,000 g/mol to 60,000,000 g/mol, or 500,000 g/mol to 60,000,000 g/mol. Other ranges are from 1,000,000 g/mol to 60,000,000 g/mol, 5,000,000 g/mol to 60,000,000 g/mol and 10,000,000 g/mol to 60,000,000 g/mol.

In another preferred embodiment, the functionalized alternan has an average molar mass Mw in the range from 12,000,000 to 30,000,000 g/mol, more preferably from 14,000,000 to 28,000,000 g/mol, even more preferably from 16,000,000 to 26,000,000 g/mol, most preferably from 19,000,000 to 23,000,000 g/mol. Non-functionalized alternan precursors with this Mw can be produced using a truncated alternan sucrase. The truncated alternan sucrases, the production process for this type of specialized alternan, and the alternan itself are described in the international application PCT/EP2008/051760, which is incorporated herein by reference.

Methods for determining the average molar mass (Mw) are known to persons skilled in the art and include, for example, measurement methods using GPC (gel permeation chromatography) coupled with corresponding detection processes such as a differential refractometer and MALLS (Multi Angle Laser Light Scattering). A preferred method for determining the molar mass distribution (MMD) and the average molar mass (Mw) in conjunction with the present invention using GPC-MALLS is described in the "General methods" chapter.

A further embodiment of the invention describes a functionalized alternan for which the average number of carboxy-functionalized hydroxyl groups in the alternan is 0.01 to 3 for each anhydroglucose unit, or 0.02 to 3, preferably 0.04 to 3.

In another embodiment, the average number of carboxy-functionalized hydroxyl groups in the alternan is 0.05 to 3 for each anhydroglucose unit, preferably 0.05 to 2, more preferably 0.05 to 1 or 0.05 to 0.5, or most preferably 0.05 to 0.4, or 0.05 to 0.3, or 0.05 to 0.2, or 0.05 to 0.1. Such values are achieved when, for instance, carboxy-functionalized alternan is produced according to the procedures described below, using an alcohol as a reaction medium. In particular, values are then obtained in the following ranges: 0.055 to 3, preferably 0.055 to 2, even more preferably 0.055 to 1, or 0.055 to 0.5, most preferably 0.055 to 0.3, or 0.055 to 0.2, or 0.055 to 0.1.

In another embodiment, the average number of carboxy-functionalized hydroxyl groups in the alternan is >0.5 to 3 for each anhydroglucose unit, preferably 0.55 to 3, or even >0.6 to 3, particularly 0.65 to 3.

The type of carboxy functionalization in hydroxyl groups of the not-yet functionalized alternan is described through an example using Formulas (I) and (II). In Formula (I), the oxygen between "Alternan" and the group described as "$R_1$COOH" originates from a hydroxyl group of an alternan (for example an alternan precursor) that is not yet functionalized at this hydroxyl group. In Formula (II), the oxygen between "Alternan" and the group described as —[$CHR_2$—$CHR_3$—O]$_n$$R_4$COOH is an oxygen from a hydroxyl group of an alternan that is not yet functionalized at this hydroxyl group. For the functionalization shown using Formula (I) and (II), a hydroxy group of the alternan is transferred to an ether bridge —O— and a functional carboxyl group is bound to it using various intermediate structures, as shown in (I) and (II). This is described as "carboxy functionalization in a hydroxyl group." Further types of carboxy functionalization that deviate from the structures in Formula (I) and (II) are possible.

The average number of functionalized hydroxyl groups in the alternan per anhydroglucose unit is also known as the "degree of substitution" and is abbreviated as "DS." Each anhydroglucose unit has a maximum of three free hydroxyl groups available, so the DS can be a maximum of 3 if all three hydroxyl groups have been substituted and there are no differences between the monomers along the chain. All of the abovementioned DS ranges can be combined in any number of ways with all of the abovementioned molar mass ranges and DP ranges for the functionalized alternan.

All of the abovementioned DS ranges can be combined in any number of ways with all of the abovementioned molar weight ranges and DP ranges for the functionalized alternan.

In the present invention, it is possible to produce a carboxy-functionalized alternan that features a combination of a high Mw, as shown above, and a high DS, particularly DS 0.05 or higher, up to the various specified upper limits. Such a product can be obtained by a process in which the liquid reaction medium primarily features an alcohol.

In one embodiment, the functionalized alternan is cross-linked. The crosslinking can be reversible or irreversible, for instance a physical or chemical crosslinking, preferably a chemical crosslinking. A series of agents and processes are suitable for reversible or irreversible crosslinking of hydroxyl groups in the alternan. Crosslinking agents are explained below using the production process for a functionalized, crosslinked alternan.

Preferably, the functionalized alternan is water-soluble. In particular, the term "water-soluble" means water solubility up to 5% by weight, preferably up to 7% by weight, or even more. Surprisingly, it was found that with the achieved substitution degrees described above, the product forms aqueous solutions with constant viscosity or gels, depending on the DS value and concentration. This property is surprising because WO0047628 describes derivatized polysaccharides with these degrees of substitution as being insoluble. Hydrogels can be created at relatively high DS values, which limit the applicable concentration for a free-flowing solution.

In addition, the resulting functionalized alternan is preferably not microstructured. In particular, the functionalized alternan is not microfibrillar; in other words, it does not feature any microfibrils. The term "microfibrillar" refers to structures that are described in WO0047628 using cellulose and derivatized cellulose. In WO0047628, p. 11, l. 5-15, microfibrils are defined as substructures with a small diameter and high length-to-diameter ratio, and with dimensions comparable to natural cellulose microfibrils. As an example, it mentions microfibrils with a diameter of about 20 to about 100 nm, and a high length-to-diameter ratio such as more than 100, 500 or 1000. Natural cellulose microfibrils are described in WO0047628 as bundles that run parallel within a matrix of amorphous structures (WO0047628, p. 10, l. 25-p. 11, l. 4, to which explicit reference is made here).

Previously known spinning techniques for cellulose, as described in WO0047628, p. 11, also cannot be used to bring the functionalized alternan in the present invention into a microfibrillar or fibrous state. Experiments have shown that the dissolved functionalized alternan does not coagulate into filaments when it emerges from a spinning nozzle into a precipitation bath.

In another embodiment, the functionalized alternan does not feature any cyclic alternan molecules, only non-cyclic alternan molecules, in other words chains that are not self-contained.

In yet another embodiment, the functionalized alternan primarily features non-cyclic alternan molecules.

In another aspect, the invention relates to a process for functionalizing alternan with carboxy groups, wherein alternan is reacted in a liquid reaction medium that primarily or exclusively comprises water or that primarily or exclusively comprises an alcohol, with a functionalization agent that comprises a carboxy group, and by adding an alkaline component.

The use of a liquid reaction medium that primarily or exclusively comprises an alcohol is particularly preferred. Such a process, or special embodiments thereof, achieve the following benefit in particular. Higher degrees of substitution and reagent yields are achieved in comparison to a system in which a purely aqueous alkaline reaction medium is used. The amount of the required functionalization agent can be limited. In other words, relatively little functionalization agent is needed in order to achieve relatively high DS values. A high DS is advantageous if the functionalized alternan will be used for metal complexing or simplex formation.

In a purely aqueous medium, even with long reaction times of 24 h and at a temperature of 60° C., reagent yields of <10% were achieved, so that only DS values <0.05 were obtainable if the reagent excess was not increased.

If the liquid reaction medium primarily comprises an alcohol, that means a volume percentage of >50 vol. %, more preferably >60 vol. %, or >70 vol. %, or >80 vol. %, most preferably >90 vol. %. As additional liquid component, a part of water may be present, for instance, particularly if aqueous alkali is added as an alkaline component to act as a catalyst as described below. In particular, the reaction medium is an alcohol-water mixture with the abovementioned vol. % of alcohol.

The term "alternan" in this context refers to a not-yet functionalized alternan, which is also called "alternan precursor" in the context of the invention. Preferably, the molar mass of the not-yet functionalized alternan is selected such that a functionalized alternan with an average molar mass Mw is obtained, as specified above in the description of the functionalized alternan.

The alcohol in an embodiment is selected from methanol, ethanol, propanol, isopropanol, butanol, or isobutanol, or any combination thereof.

An alkaline component as a catalyst, in the context of the invention, is to be understood to be a substance that contains hydroxide ions (OH—) or forms hydroxide ions once it is added to the reaction mixture. Bases, carbonates and alkaline earth oxides are encompassed. The catalyst can be liquid, solid or gaseous. Preferably, a liquid alkaline component is used.

In one embodiment, the alkaline component is a aqueous solution or suspension of an alkali or alkaline earth hydroxide, or a aqueous solution or suspension of an alkaline earth oxide. The hydroxide is preferably selected from lithium hydroxide, sodium hydroxide, potassium hydroxide, barium hydroxide and calcium hydroxide, wherein the alkaline component is preferably aqueous sodium hydroxide or aqueous potassium hydroxide or calcium oxide dissolved in water.

The process can be performed in the following steps:
a) dissolving and/or suspending of alternan in an alkaline aqueous medium, wherein alternan swells and is partially dissolved,
b) adding alcohol, for instance ethanol, to reverse the swelling of the alkalized alternan, preferably while stirring,
c) or as an alternative to a) and b), a direct suspension of the alternan in alkaline alcohol, for instance ethanol,
d) or as an alternative to a), b) and c), suspending alternan in alcohol, for instance ethanol, and adding alkali, for instance in liquid or dry form,
e) adding the functionalizing agent, preferably while stirring,
f) heating to the reaction temperature and performing the reaction, preferably while keeping the synthesis temperature constant, preferably while stirring.

Next, the following steps can be performed:
g) ending the synthesis by cooling and preferably by adding more alcohol, for instance ethanol
h) separating the alternan.

In addition, the following reprocessing and cleaning steps can be performed:
i) suspending the alternan product, preferably in an alcohol/water mixture, for instance in MeOH/water (for example 8:2; v/v)
j) setting a neutral or nearly neutral pH value, for instance with glacial acetic acid
k) washing the product, for instance in an alcohol/water mixture and/or alcohol, particularly with MeOH/water (8:2; v/v) and then with methanol
l) drying, for instance vacuum-drying.

Whether Step a) produces a solution or a suspension depends on the concentration of the non-functionalized alternan, which depends, inter alia, on its molar mass. Preferably, a swollen suspension is produced.

The process is preferably performed under normal pressure, in other words ambient pressure.

The equipment for performing the process is not limited to specialized devices. In general, reactors can be used that are also used for producing carboxymethylcellulose. Some examples are stirred tank reactors, plug-flow reactors and kneaders.

The process is preferably performed at a temperature between 10° C. and 80° C., preferably 20-70° C., particularly if an alcohol, especially ethanol or (iso)propanol, is used. For ethanol, the preferred temperature is 20° C. to 70° C., even more preferably 20° C. to 40° C. The maximum temperature, at normal pressure, is determined by the boiling temperature of the alcohol used, and the maximum selected temperature is preferably lower than the boiling temperature.

In order to obtain compounds of Formula (I), a non-functionalized alternan can be reacted with a functionalizing agent that has the following Formula (IV)

(IV)

wherein $R_1$ has the same meaning as described above in Formula (I) and X is a halogen atom, particularly chloride, bromine or iodine. Particularly preferred functionalization agents are monochloracetic acid and bromine acetic acid, or salts thereof, such as alkali metal salts. Through reaction with these agents, functionalized alternans as in Formula (I) can be produced, wherein $R_1$ is methylene.

The following describes process variants wherein the non-functionalized alternan or the alternan functionalized with carboxy groups is reacted with one or more epoxy compounds.

In a first process variant, non-functionalized alternan is first reacted with one or more epoxy compounds, which preferably have the Formula (V):

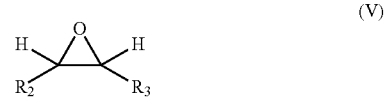

(V)

wherein $R_2$ and $R_3$ are defined as shown above in Formula (II). Preferred compounds as in Formula (V) are ethylene oxide and propylene oxide. The result is an alternan that comprises one or more groups of Formula (III) as functionalizations,

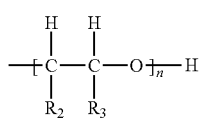

(III)

wherein n is an integer from 1 to 30, preferably from 1 to about 20, even more preferably from 1 to about 10. Afterwards, the product can be reacted with a compound of Formula (VI),

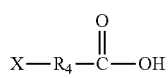

(VI)

wherein $R_4$ is a hydrocarbon group with 1 to about 10 carbon atoms, preferably a methylene group, and X is a halogen atom, particularly chlorine, bromine or iodine. The product is a compound comprising structures of Formula (II),

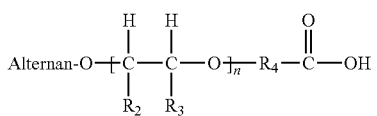

(II)

wherein one or more —[$CHR_2$—$CHR_3$—O]$_n$$R_4$COOH groups can be present at the alternan.

The compound of Formula (VI) can react with terminal OH groups that are present in groups of Formula (III). This conversion does not need to be complete. In the event of an incomplete conversion, the result is a functionalized alternan featuring structures of Formula (II) as well as groups of Formula (III). The degree of conversion can be adjusted using the reagent volume and reaction conditions.

In addition, the compound of in Formula (VI) can also react with free, non-functionalized OH groups that are found directly at the alternan backbone, in other words with OH groups that were not previously functionalized with groups of Formula (III). In this case, structures of Formula (VII) are also obtained:

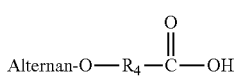

(VII)

In a second version of the process, an alternan that is already carboxy-group-functionalized, having structures of Formula (I),

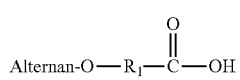

(I)

is reacted with an epoxy compound or multiple different epoxy compounds, preferably having Formula (V):

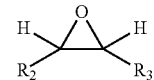

(V)

The result is a carboxy-functionalized alternan that features structures of Formula (I) as well as groups of the above Formula (III).

Additional process variants using different sequences of reaction steps are also possible.

The molar ratios of the substances used in the process are selected according to the desired results. In particular, the molar ratio of the alternan monomer (anhydroglucose) and the functionalization agent is adjusted to the desired degree of substitution.

For instance, the following molar ratios can be used:

Ratio between the alternan monomer (anhydroglucose): functionalization agent of 1:0.01 to 1:5, preferably 1:0.1 to 1:2.

The ratio of the alternan monomer (anhydroglucose): hydroxide ions in the alkaline component can be selected as already known from the production of carboxymethyl cellulose. An exemplary range is 1:0.1 to 1:2.

In this process, the functionalized alternan can be crosslinked, or alternan can first be crosslinked and then functionalized; the first option is preferable. Thus the process comprises a crosslinking step in one embodiment.

The crosslinking can be a chemical crosslinking, for instance using the following crosslinking agents:

Low-molecular aldehydes, ketones and oxidants, such as formaldehyde, glyoxal, pyruvic acid or glutaraldehyde.

Organic, polybasic acid chlorides and their derivatives, for instance succinic acid, glutaric acid, citric acid, adipic acid, malic acid, malonic acid, tartaric acid.

Inorganic crosslinking agents such as inorganic polybasic acids, alkali hypochlorite (includes $Cl_2$ in an alkaline environment), carbonyl chloride, phosphorus oxychloride, polyphosphate, akali-trimetaphosphate, polyfunctional silanes.

Epoxy compounds, their derivatives and reactive oligomers and polymers such as epichlorhydrin, epichlorhydrin derivatives, e.g. monofunctional and multifunctional glycidyl ethers, epoxihalides, substituted epoxides, polyepoxides, aliphatic dihalides, substituted polyethylene glycols such as diglycol dichloride.

Grafting agents that can be further reacted to form crosslinking sites, for instance through radical linking or the polymerization of double bonds. Some examples are acrylic acid compounds, substituted acrylates, compounds containing vinyl groups, aldehyde amide condensates.

In another variant, crosslinks are created physically, for instance through:

Thermal processes (waterless), including melting
Hydrothermic processes (heat/moisture treatment)
Compounding
Freezing/thawing processes In another aspect, the present invention relates to a composition, particularly a cosmetic composition, pharmaceutical composition, wound protectant, ultrasound gel, coating agent, cleaning or laundry additive, sizing agent for textile fibers, simplex creator, paper treatment or manufacturing agent, water treatment agent, drilling fluid, foodstuff, food additive, adsorbent, biocide, encapsulant, agrarian composition, complexing agent, emulsifier, surfactant, viscosity regulator, binding agent, adhesive, protective colloid, dispersion agent, ion exchanger, water softener, coagulant, drying additive, anti-condensation additive or drilling additive, comprising a functionalized alternan as described above. In addition, the invention relates to the use of the functionalized alternan in such a composition or for manufacturing such a composition. This also includes the use of the functionalized alternan polysaccharide as the main component or sole substance in the abovementioned applications.

The terms drying additive and anti-condensation additive mean that the functionalized alternan polysaccharide is added to a drying agent or anti-condensation agent as an additional component. In this mixture, the functionalized alternan polysaccharide may also act as a viscosity regulator, for instance for thickening a drying agent that has absorbed water.

Preferably, the foodstuffs of the invention, also described herein as "foods," are compositions that contain a functionalized alternan of the invention and (at least) one substance that is ingested by people for nourishment. Substances that people ingest for nourishment include fiber, minerals, water, carbohydrates, proteins, fats, vitamins, secondary plant materials, trace elements, aromas, flavorings and/or food additives.

The cosmetic compositions of the invention should preferably be compositions that contain alternan of the invention and one or more of the ingredients listed in the INCI nomenclature (INCI: International Nomenclature of Cosmetic Ingredients). Ingredients in the INCO nomenclature are published in the "International Cosmetic Ingredient Dictionary and Handbook," 11th edition, January 2006, publisher: CTFA, ISBN: 1882621360, among other places. The cosmetic compositions particularly relate to thickening agents for products like creams, gels, soaps and pastes, liquid cleaning agents and care products, stabilizers for foams, and absorbents in hygiene products.

The pharmaceutical compositions of the invention are preferably compositions that contain a functionalized alternan of the invention and (at least) one pharmacologically effective substance in liquids, gels, pastes, films, tablets or delayed-release systems.

One special application for the functionalized alternan in a pharmaceutical composition is its use as an encapsulant for one or more therapeutic active ingredients.

In a pharmaceutical composition, the functionalized alternan can also be present as a therapeutic active ingredient.

As an encapsulant, the functionalized alternan can generally be used for the encapsulation of other substances or living materials, particularly living cells.

In particular, the functionalized alternans of the invention can be suitable for use in food/food compositions that require a certain thickening performance, by providing viscosity and forming gels at relatively low concentrations. Thus they can be used as a viscosity regulator or gelling agent in the manufacturing and preparation process (e.g. in dairy products, baked goods, beverages, desserts, jams, sauces, puddings, sausage products, candy, partially and fully prepared foods, etc.). Since functionalized alternans of the invention demonstrate little or no cloudiness, they are particularly suitable for use in foods that should or must appear clear. The stabilizing effect and/or emulsifying activity of the functionalized alternans of the invention makes them especially suitable for use in foods that comprise lipophilic (e.g. fats) as well as hydrophilic components.

For cosmetic and pharmaceutical compositions, the viscosity imparting properties of functionalized alternans of the invention, as well as their emulsion-stabilizing and/or emulsifying properties are particularly important. Therefore they can be components of tinctures, creams, lotions, salves, sunscreens, cosmetics, toothpastes, body and hair care products, etc. Since the functionalized alternans of the invention can form various gels, they are also particularly well suited for manufacture of hydrogels. For pharmaceutical compounds, the functionalized alternans of the invention can be used as disintegrants, for instance in tablets.

In yet another aspect, the invention also relates to the use of a functionalized alternan as described above, as the sole component or optionally with further components, in a cosmetic composition, a pharmaceutical composition, a wound protectant, an ultrasound gel, a coating agent, a cleaning agent or washing agent additive, a sizing agent for textile fibers, a simplex creator, a paper manufacturing or paper treatment agent, a water treatment agent, a drilling fluid, a foodstuff, a food additive, an adsorbent, a biocide, an encapsulant, an agrarian composition, a complexing agent, an emulsifier, surfactant, viscosity regulator, binding agent, adhesive, protective colloid, dispersion agent, ion exchanger, water softener, coagulant, drying additive, anti-condensation additive or drilling additive.

In these applications, the functionalized alternan can be used alone or in combination with other components. For instance, the functionalized alternan can itself be used as a wound protectant, food additive, coating agent, binding agent, paper manufacturing or paper treatment agent, water treatment agent, biocide, encapsulant, complexing agent, emulsifier, surfactant, viscosity regulator, binding agent, adhesive, protective colloid, dispersion agent, ion exchanger, water softener, coagulant, drying additive, anti-condensation additive, sizing agent for textile fibers, simplex creator or drilling additive.

The invention is described using examples below.

A) Description of Figures

FIG. 1 shows the molar mass distributions for carboxymethyl alternan with various DS values.

Figure 2:
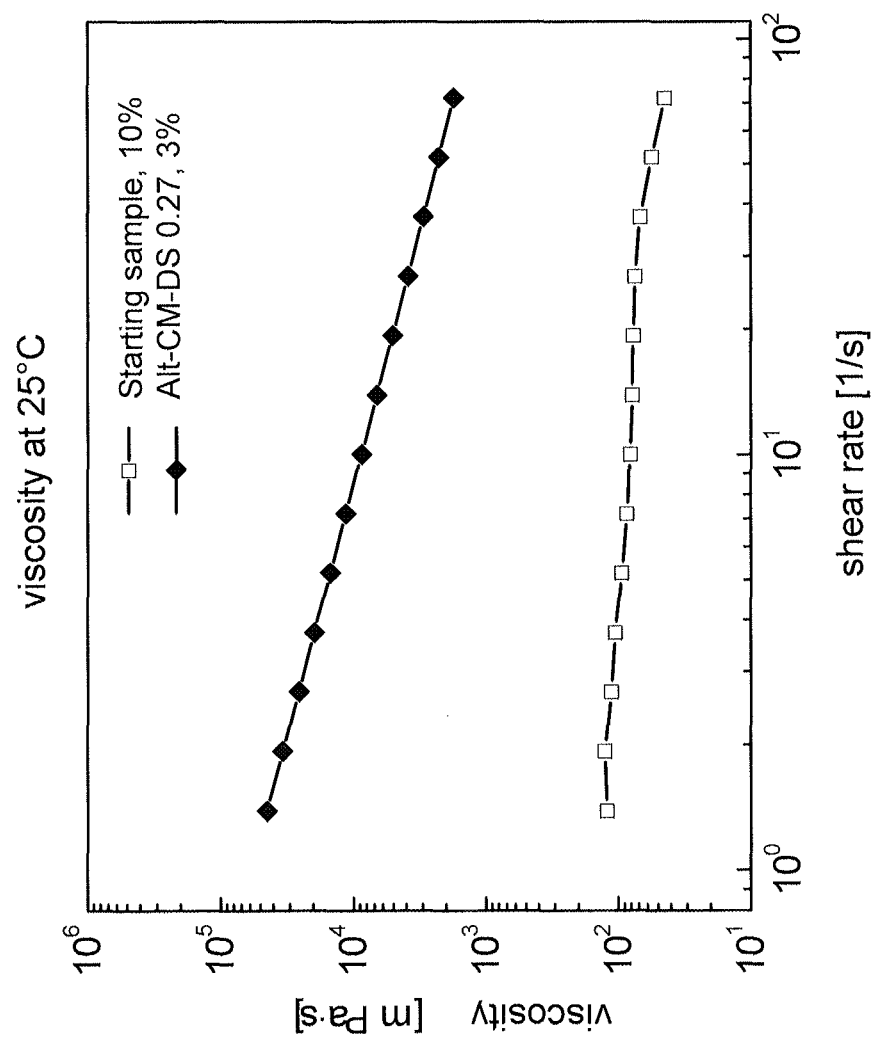
FIG. 2 shows the flow behavior of carboxymethyl alternan in a aqueous solution compared to the corresponding non-functionalized alternan precursor in a aqueous solution.

FIG. 2 shows the flow behavior of carboxymethyl alternan in a aqueous solution compared to the corresponding non-functionalized alternan precursor in a aqueous solution.

Figure 3:
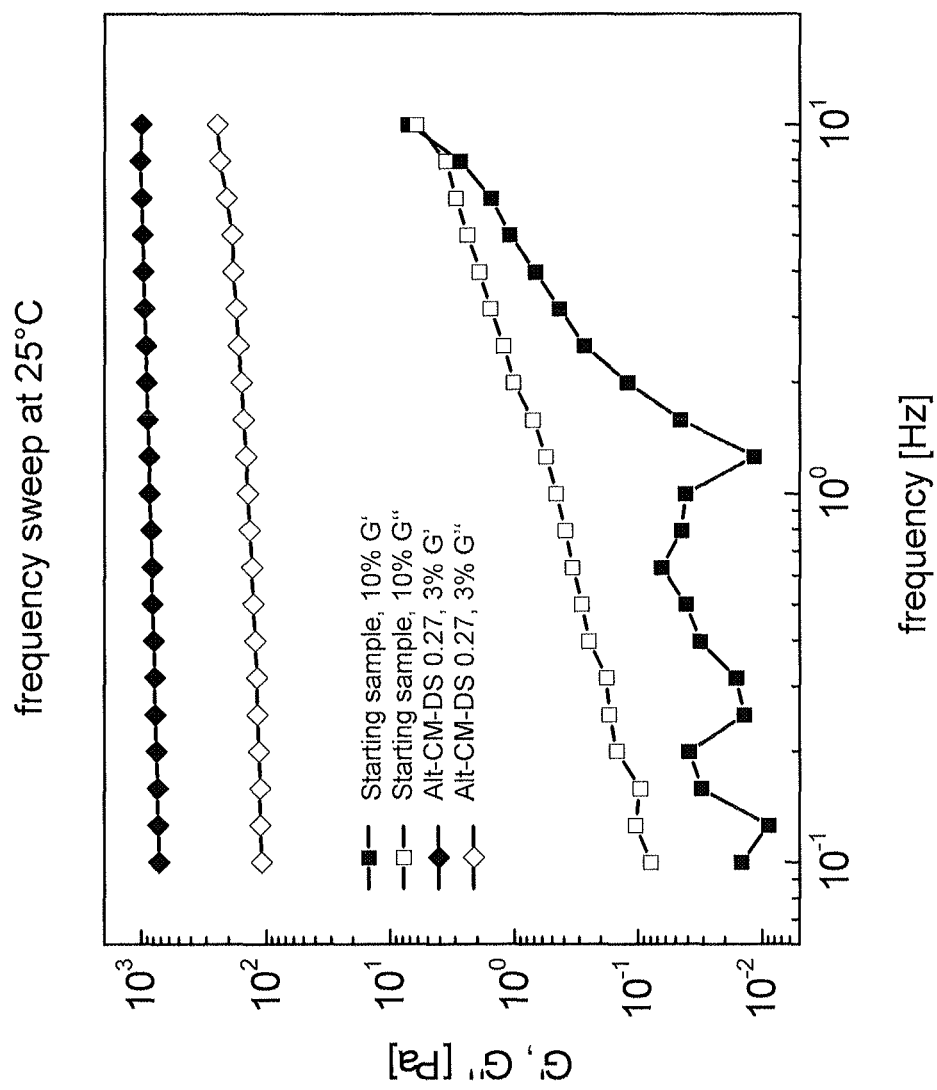
FIG. 3 shows a frequency sweep with dynamic rheology for carboxymethyl alternan in a aqueous solution compared to the corresponding non-functionalized alternan precursor.

FIG. 3 shows a frequency sweep with dynamic rheology for carboxymethyl alternan in a aqueous solution compared to the corresponding non-functionalized alternan precursor.

B) General Methods

1. Producing Alternan

Alternan can be produced using the enzyme alternan sucrase. The enzyme alternan sucrase can be produced in various ways using procedures known to persons skilled in the art. The production of alternan sucrase and alternan using bacterial strains from the *Leuconostoc mesenteroides* species is described inter alia in Raemaekers et al (1997, J. Chem. Tech. Biotechnol. 69, 470-478) and in WO 2006 088884 (see particularly Example 1). However, processes that use *Leuconostoc mesenteroides* bacterial strains for producing the enzyme alternan sucrase have the disadvantage that these strains also produce other sucrases, particularly dextransucrases. These other sucrases could not previously be separated from alternan sucrases. Thus they are a mixture of various enzymes. The alternan produced using this type of enzyme mixture thus also contains a small amount of dextran in addition to alternan. To produce pure alternan, methods for producing alternan sucrase using recombinant organisms are thus preferred.

Processes for producing alternan sucrase using recombinant organisms, and for producing alternan using the enzyme produced in this way, are described in WO 2000 47727, US 2003 229923 (see particularly Examples 2, 5 and 8) and Joucla et al (2006, FEBS Letters 580, 763-768), among others.

2. Determining the Degree of Substitution (DS)

The DS value is determined on the basis of the counterion sodium+ of the carboxy methyl group of the alternan.

The carboxymethylized alternan was transferred into a thinned aqueous solution after adding concentrated nitric acid and after microwave disintegration.

Using optical emission spectrometry with inductively coupled plasma (ICP-OES), $Na^+$ was identified and quantified.

3. Determining the Molar Mass Distribution Using GPC-MALLS

In order to determine the molar mass distribution using gel permeation chromatography, coupled with a multiple-angled laser light detector, the following devices and conditions were used:

Devices: Gel chromatograph PL120 from Polymer Laboratories
  Waters Autosampler 717
  DAWN EOS light scattering detector from Wyatt Technology Santa Barbara with $\lambda_0=690$ nm and 16 detectors within the angle from 14.9 to 162.9° as well as K5 flow-through cell
  Refractive index detector 410 from Waters
Columns: SUPREMA gel from PSS Mainz
  Precolumn
  Column S100 with separation range $300\text{-}10^4$
  Column S1000 with separation range $5\cdot10^4\text{-}2\cdot10^6$
  Column S30000 with separation range $10^6\text{-}10^8$
  connected serially
Elution: Eluent 0.2 m $NaNO_3$, flow rate 0.8 ml/min., temperature 35° C., injection volume 100 µl
Solution: The samples were dissolved in a 0.2% water solution for 24 h at room temperature and 1 h at 95° C., and filtered using a 5 µm membrane filter
Analysis:
  The light-scattering data was analyzed using ASTRA Software 4.90.08.

4. Rheological Characterization
Rheometer

The rheometer used was the Kinexus from Malvern. The device has the following specifications:
  Measurement systems. Plate-plate, cone-plate, coaxial cylinder, double gap
  Torque range from 0.05 µNm to 200 mNm; torque resolution at 0.1 nNm
  Frequency range: 1 µHz-150 Hz
  Temperature range: −40-200° C.; resolution at 0.01° C.
  Producing the Solutions The aqueous solution for the carboxy methyl alternan was stirred in deionized water for 60 minutes at room temperature, at the respective quantity ratios for the concentration.
  Measuring the Flow Behavior Viscosity was measured in the cone-plate measurement system directly after the solution was produced, in dependency of the shear rate.
  Dynamic Rheology Dynamic rheology is used to measure the structure of a solution or dispersion, a gel or a solid body by measuring the storage (G') and loss modulus (G") and/or the elastic and viscous proportion in dependency of the frequency or the deformation. This method was used to measure G' and G" depending on the frequency, and to evaluate the structure of the carboxy methyl alternan in water at the respective concentration, compared to the unsubstituted alternan, based on the results of the measurement data. The selected frequency range was between 0.1-10 Hz.

Performance of Rheological Measurements.
  Measurement system: Cone-plate measurement system
  Concentration of the aqueous solutions: 3-10%
  Temperature: 25° C.

The methodology for rheological characterization was as follows:
  Flow behavior in the range of the shear rate between 1 and 100 $s^{-1}$
  Frequency sweep from 1-10 Hz C) Examples 1. Carboxymethylization of Alternan Preliminary remarks: The main difference in the physical characteristics between the alternan and cellulose or starch is that it is water-soluble and that it has a higher swelling power in alkali than cellulose or starch. This affected the applicable material density in the reaction medium. Preliminary experiments showed that synthesis conditions in a purely aqueous environment did not create the desired degree of substitution, and the concentration ratios of the alternan to the reagent and alkalization amount had to be investigated, along with the design of the derivatization in terms of changing the solution structure of the alternan as well as temperature and time.

1.1 Synthesizing carboxy methyl alternan with DS 0.01
Chemicals:
3.875 ml 50% NaOH
3.5 g monochloroacetic acid
Procedure
Producing the aqueous alternan solution:
  447.4 g $H_2O$ placed in the reactor with an anchor-type agitator, 52.6 g of alternan slowly stirred in at 150 r/min., heating the dispersion to 90° C. while stirring, stirring at 90° C., 2 h
  300 g of alternan solution placed in the 500 ml Parr reactor
  Drop-by-drop addition of 3.875 ml 50% NaOH while stirring
  Drop-by-drop addition of 3.5 g monochloroacetic acid at room temperature while stirring
  Heated to 60° C. while stirring, 24 h at 60° C. while stirring at 150 r/min.
  Cooled off while stirring
  Neutralized with HCl
  Precipitation with ethanol and removal via suction filter
  Washed with ethanol/water (40:20; v/v)
  Vaccuum-dried 1.2 Synthesis of carboxy methyl alternan with DS>0.27
Chemicals:
300 ml ethanol
27.04 ml of 11.5 m NaOH (dissolved in 100 ml of ethanol)
16.07 g monochloroacetic acid
Procedure
42.04 g (40.0 g dried) of alternan suspended in 180 ml of ethanol
NaOH added to ethanol while stirring
Drop-by-drop addition of monochloroacetic acid at room temperature while stirring Heated to 70° C. while stirring, stirred for 1 h at 70° C.
Cooled while stirring
Neutralized with HCl
Washed with ethanol/water (4:1 v/v)
Vacuum-dried 2. Producing Aqueous Solutions The carboxymethylized alternan was used to produce aqueous 1% solutions at room temperature and at 95°. The solutions were homogenous and showed hardly any sedimentation, and they differed in terms of their transparency. The differences in transparency were measured using spectral photometry in comparison to the initial sample, at a wavelength of 650 nm. The following table gives an overview of the measurement data. Transparency was significantly improved by the substitution.

TABLE 2

Transparency of carboxylized alternan in solution

| Sample | Transparency at 650 nm, c = 1% | |
|---|---|---|
| | After solution produced at 25° C. | After solution produced at 95° C. |
| Alternan | 70.8 | 75.0 |
| Alt-CM-DS-0.001 | 86.0 | 91.9 |
| Alt-CM-DS-0.01 | 91.3 | 96.2 |

3. Molecular Characterization

FIG. 1 shows the molar mass distribution for various carboxylized alternans. When using higher amounts of reagents and alkalization agents in carboxymethylization for the DS range >0.1, a clear molecular degradation was generated.

4. Rheological Characteristics

The carboxylated alternan was characterized in terms of the flow behavior, in dependency of the shear rate, and using dynamic rheology for the solution structure.

Carboxymethylization resulted in alternan derivatives that formed such strong viscosity that it was no longer possible to produce and measure 10% aqueous solutions, and the concentration had to be lowered to 3%. The viscosities were several times higher than for the 10% alternan solution (FIG. 2). The values for G' (storage modulus) and G" (loss modulus) were also increased. G' (storage modulus) and G" (loss modulus) showed hardly any dependency on the frequency. The storage modulus showed much higher values than the loss modulus (FIG. 3), which is evidence of a gel state. The ionic alternan ethers with a high molar mass demonstrated the characteristic of hydrogel formation, which was surprising at relatively low degrees of substitution. The gel is formed through entanglements of the macromolecules, not through stereo-regular bond zones via intermolecular H bridges.

5. Spinning Experiments

The following are the results of investigating filament formation with 10% and 12.5% aqueous solutions of the alternan.

The solutions could be pressed through a nozzle into a coagulation bath containing denatured ethanol. The capacity to coagulate was investigated at 0° C., room temperature and 70° C. When they emerged from the nozzle, the alternan solutions did not form a string, but rather drops, which formed a fine white precipitate in the coagulation bath at every temperature investigated.

In further experiments, the concentrated alternan solution was extruded. In the process, it first formed a colorless string that was guided directly into the coagulation bath. The string turned white due to the dehydration and disintegrated into small particles. The string did not have any mechanical stability. The temperature of the coagulation medium did not have any significant effect on string stability.

It was not possible to create a fibrillar structure with alternan.

The invention claimed is:

1. A functionalized alternan polysaccharide, comprising structures of Formula (II):

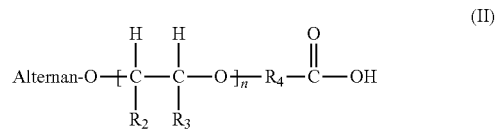

wherein
n is an integer from 1 to about 30,
$R_2$ and $R_3$ are selected from H or a hydrocarbon group with 1 to about 6 carbon atoms, wherein $R_2$ and $R_3$ can have the same or different meaning in the —($CHR_2$—$CHR_3O$)— units and each $R_2$ and $R_3$ in a —($CHR_2$—$CHR_3O$)— unit can be selected independently from each $R_2$ and $R_3$ in another —($CHR_2$—$CHR_3$—O)— unit,
$R_4$ is a hydrocarbon group with 1 to about 10 carbon atoms, wherein the alternan can comprise one or more of the —[$CHR_2$—$CHR_3$—O]$_n$$R_4$COOH groups, wherein each n can be selected independently, and
wherein one or more of the —[$CHR_2$—$CHR_3$—O]$_n$ $R_4$COOH groups can be deprotonated to —[$CHR_2$— $CHR_3$—O]$_n$$R_4$COO$^-$.

2. The functionalized alternan polysaccharide according to claim 1, wherein $R_4$ is an alkylene group.

3. The functionalized alternan polysaccharide according to claim 1, further comprising one or more of the groups of Formula (III)

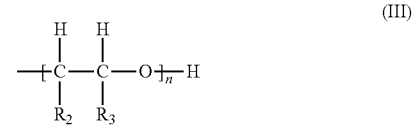

wherein the group of Formula (III) is bound to the alternan polysaccharide via an ether bridge,
n is an integer from 1 to about 30,
$R_2$ and $R_3$ are selected from H or a hydrocarbon group with 1 to about 6 carbon atoms, wherein $R_2$ and $R_3$ can have the same or different meaning in the —($CHR_2$—$CHR_3O$)— units and each $R_2$ and $R_3$ in a —($CHR_2$—$CHR_3O$)— unit can be selected independently from each $R_2$ and $R_3$ in another —($CHR_2$— $CHR_3$—O)— unit.

4. The functionalized alternan polysaccharide according to claim 1, wherein the functionalized alternan polysaccharide has a weight average molar weight Mw in the range from 3,000 g/mol to 60,000,000 g/mol.

5. The functionalized alternan polysaccharide according to claim 1, wherein an average number of carboxy-functionalized hydroxyl groups in the alternan is 0.02 to 3 per anhydroglucose unit.

6. The functionalized alternan polysaccharide according to claim 1, wherein the functionalized alternan polysaccharide is crosslinked.

7. The functionalized alternan polysaccharide according to claim 1, wherein the functionalized alternan polysaccharide is water-soluble.

8. The functionalized alternan polysaccharide according to claim 1, wherein the functionalized alternan polysaccharide is not micro-structured.

9. A cosmetic composition, pharmaceutical composition, wound protectant, ultrasound gel, coating agent, cleaning or laundry additive, sizing agent for textile fibers, simplex creator, paper treatment or manufacturing agent, water treatment agent, drilling fluid, foodstuff, food additive, adsorbent, biocide, encapsulant, agrarian composition, complexing agent, emulsifier, surfactant, viscosity regulator, binding agent, adhesive, protective colloid, dispersion agent, ion exchanger, water softener, coagulant, drying additive, anti-condensation additive or drilling additive, that comprises or consists of a functionalized alternan-polysaccharide according to claim 1.

10. A functionalized alternan polysaccharide comprising carboxy groups as functional groups, wherein the alternan polysaccharide comprises structures of Formula (I):

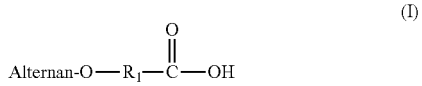

wherein $R_1$ is a hydrocarbon group with 1 to about 100 carbon atoms, wherein said group can comprise one or more heteroatoms, and wherein the alternan can contain one or more of the —$R_1$—COOH groups, and wherein one or more of the groups —$R_1$—COOH can be deprotonated to —$R_1$—COO⁻, and wherein the oxygen between "Alternan" and $R_1$ in Formula (I) is an oxygen of an ether group, further comprising one or more of the groups of Formula (III)

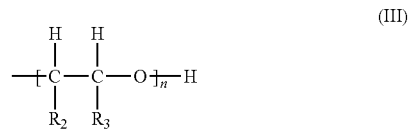

wherein the group of Formula (III) is bound to the alternan polysaccharide via an ether bridge, n is an integer from 1 to about 30, $R_2$ and $R_3$ are selected from H or a hydrocarbon group with 1 to about 6 carbon atoms, wherein $R_2$ and $R_3$ can have the same or different meaning in the —($CHR_2$—$CHR_3O$)— units and each $R_2$ and $R_3$ in a —($CHR_2$—$CHR_3O$)— unit can be selected independently from each $R_2$ and $R_3$ in another —($CHR_2$—$CHR_3$—O)— unit.

11. A method for functionalizing an alternan polysaccharide with carboxy groups to produce the functionalized alternan polysaccharide according to claim 1, wherein an alternan polysaccharide is reacted in a liquid reaction medium that primarily comprises water or primarily comprises an alcohol, with a functionalization agent that comprises a carboxy group, with addition of an alkaline component.

12. The method according to claim 11, wherein the alternan polysaccharide or the alternan polysaccharide functionalized with carboxy groups is in a further step reacted with one or more epoxy compounds.

13. The method according to claim 11, wherein the liquid reaction medium primarily comprises an alcohol selected from the group consisting of methanol, ethanol, propanol, isopropanol, butanol, isobutanol, and mixtures thereof.

14. The method according to claim 11, where the method comprises a crosslinking step.

* * * * *